United States Patent [19]

Cornelius

[11] 3,795,365
[45] Mar. 5, 1974

[54] DRIVE APPARATUS FOR AN IRRIGATION SYSTEM

[75] Inventor: Gail Cornelius, Portland, Oreg.

[73] Assignee: R. M. Wade & Co., Portland, Oreg.

[22] Filed: Apr. 17, 1973

[21] Appl. No.: 352,064

[52] U.S. Cl................ 239/212, 239/192, 239/251, 137/344
[51] Int. Cl.......................... A01g 25/02, B05b 3/06
[58] Field of Search..... 239/97, 178, 183, 191, 192, 239/212, 251, 255; 137/344

[56] References Cited
UNITED STATES PATENTS

| | | | |
|---|---|---|---|
| 2,788,242 | 4/1957 | Jepson | 239/183 X |
| 3,583,639 | 6/1971 | Cornelius | 239/191 X |
| 3,729,141 | 4/1973 | Cornelius | 239/191 X |

Primary Examiner—M. Henson Wood, Jr.
Assistant Examiner—Michael Y. Mar
Attorney, Agent, or Firm—Fryer, Tjensvold, Phillips & Lempio

[57] ABSTRACT

An irrigation system has a pipeline supported by a plurality of towers, with each tower being mounted on wheels. Each tower includes a vertical single piece sleeve into which is positioned a vertical shaft, the bottom end of which is supported. A pair of spaced annular seals are disposed within the sleeve and about the shaft. Means are included for introducing flowing water into the sleeve between the seal, into and through passage means in the shaft, and through a pair of rotor arms fixed to the upper end of the shaft. The arms are shaped and angled so that water flowing therefrom turns the shaft about its longitudinal axis, such rotation of the shaft being used to rotate, through appropriate means, the wheels of the tower, to advance the tower and the pipeline therewith.

7 Claims, 4 Drawing Figures

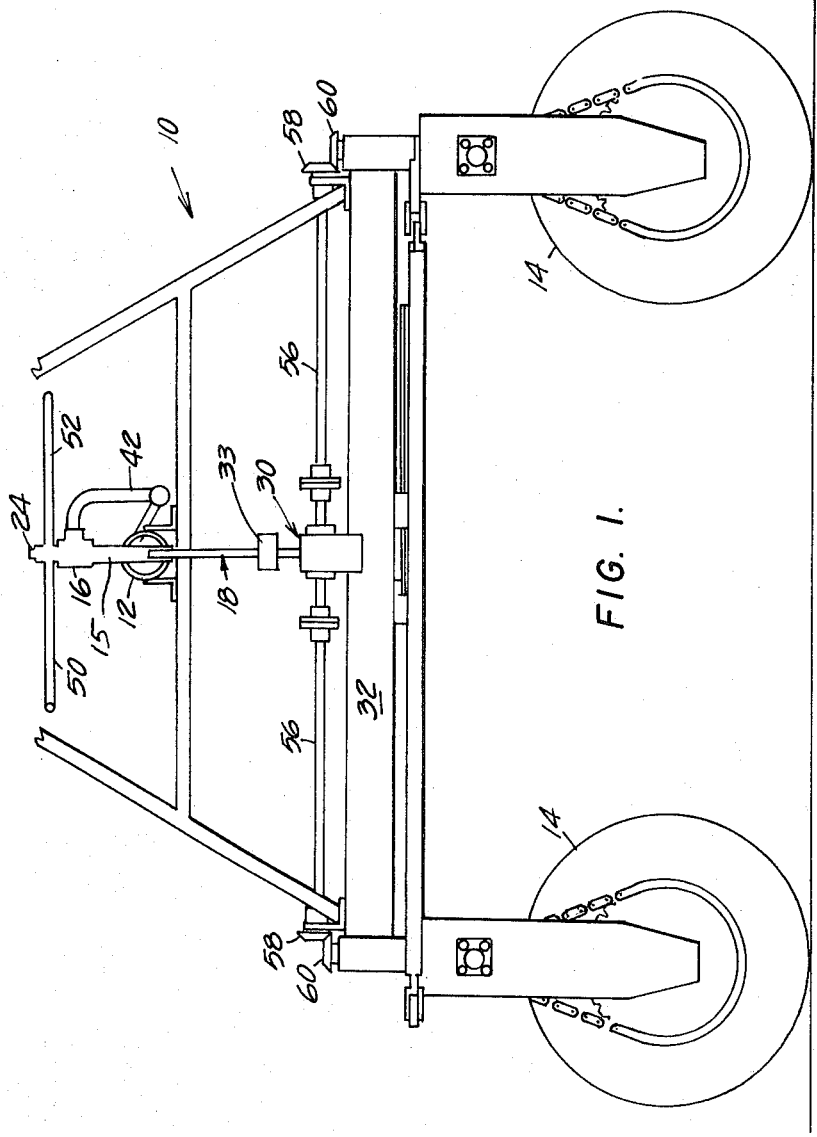

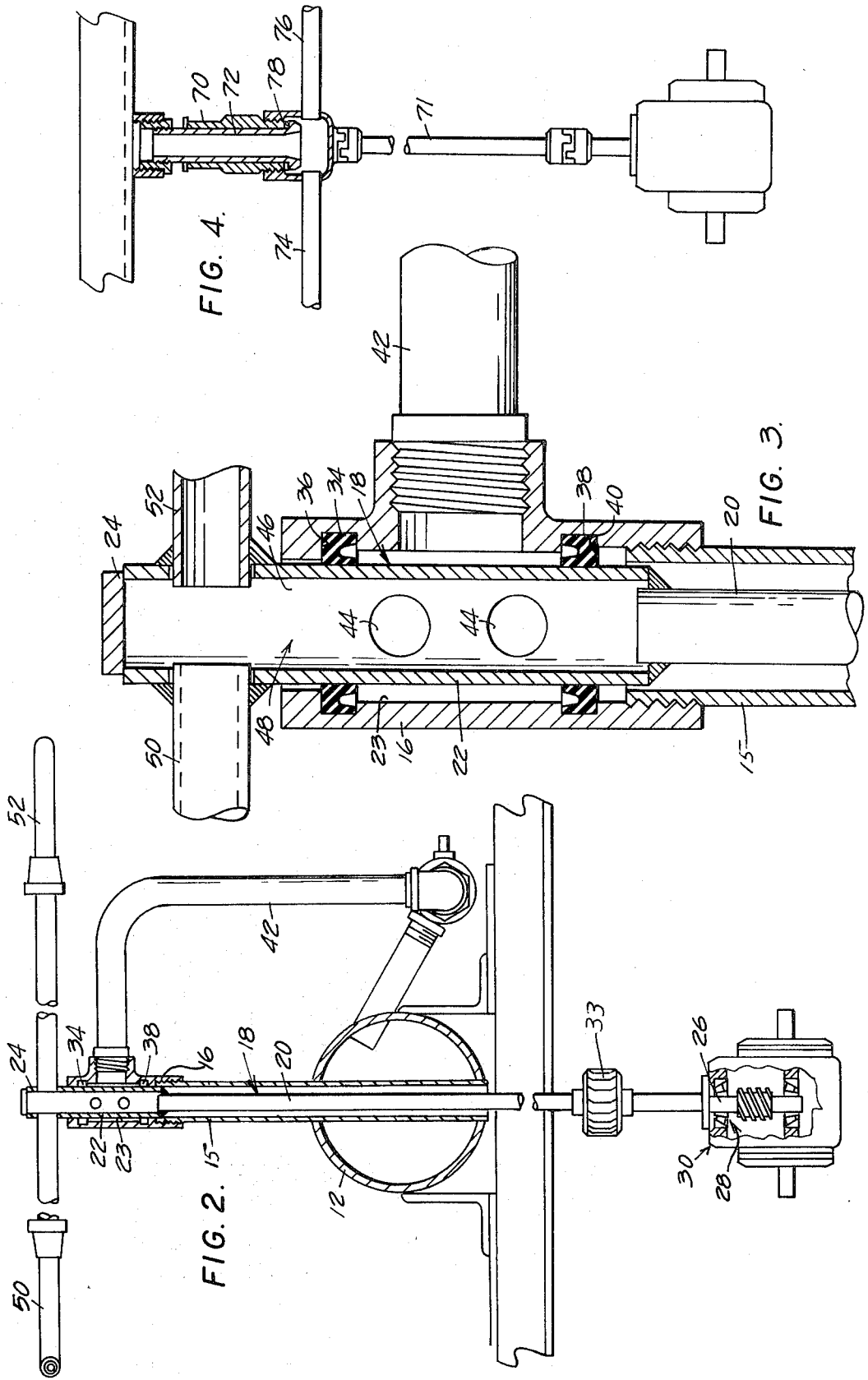

DRIVE APPARATUS FOR AN IRRIGATION SYSTEM

BACKGROUND OF THE INVENTION

This invention relates to irrigation systems, and more particularly, to an irrigation system which utilizes a plurality of towers which carry a pipeline, and the means for transporting said towers.

In a well-known type of irrigation system, large towers, which carry a pipeline, are transported over the area to be irrigated by means of water flowing through angled pipes to rotate shafts associated with the towers. Each shaft is operatively connected to wheels which support the associated tower, so that rotation of such shaft rotates the tower wheels to move the tower, See, for example, U.S. Pat. No. 3,583,639 to Cornelius, assigned to the Assignee of this application.

In such case, the shaft thereof is disposed vertically, and the weight thereof is carried by a thrust washer which also acts as a water seal.

In such a system, it has been found that after a relatively short time, such a seal, because of the weight carried thereby, fails, resulting in a loss of water used as power, and also resulting in foreign matter such as sand entering into areas where such presence is undesirable, causing an increase in friction and an additional power loss.

It will be understood, of course, that in such an irrigation system, relatively great weights and loads are involved, and that the power supplied to move these loads is critical. Consequently, such power loss as mentioned above can be a serious problem.

Of more general interest in this area are U.S. Pat. No. 2,395,253 to Covey, U.S. Pat. No. 2,716,573 to Egly et al, U.S. Pat. No. 2,905,392 to Keltner, U.S. Pat. No. 849,505 to Schroedter, and U.S. Pat. No. 3,704,827 to Moulton.

SUMMARY OF THE INVENTION

It is an object of this invention to provide, in an irrigation system including rotating water-driven shafts which move towers, seal means associated with said shafts, which are non-load-supporting.

It is a further object of this invention to provide, in an irrigation system including rotating water-driven shafts which move towers, seal means which are relatively free from wear.

Broadly stated, the invention is in an irrigation system having a water-carrying pipeline supported by a plurality of towers, each tower being mounted on wheels. Such invention comprises apparatus associated with each tower for advancing each tower and thus the pipeline over an area to be irrigated. Such invention comprises a single piece sleeve fixed relative to the pipeline, and a shaft positioned through the sleeve in spaced relation to the inner surface of the sleeve, and having an end extending therefrom. Means are included for supporting the shaft in such position through the sleeve. The inner surface of said sleeve defines first and second spaced annular grooves. Further included are first annular seal means disposed in the first annular groove and between the shaft and the sleeve for sealing therebetween. Second annular seal means are disposed in the second annular groove and between the shaft and the sleeve for sealing therebetween, and in a position spaced from the first seal means. Means are included for introducing water into the sleeve between the first and second seal means, and passage means are defined by the shaft for allowing passage of the water introduced in the sleeve to flow through the passage means to the extended end of the shaft. Tubular rotor arm means are fixed to the extending end of the shaft, the bore means thereof communicating with the passage means of the shaft, so that water flows through the sleeve between the first and second seal means, through the passage means defined by the shaft, and through the tubular rotor arm means, the tubular rotor arm means being angled so that the flow of water therefrom rotates the shaft about its longitudinal axis. Means are operatively connected to the shaft for transforming the rotating movement of the shaft into rotation of the wheels, to thereby advance the tower.

BRIEF DESCRIPTION OF THE DRAWINGS

These and other objects of the invention will become apparent from a study of the following specification and drawings, in which:

FIG. 1 is a side elevation of the lower portion of a sprinkler line support tower;

FIG. 2 is a sectional view of the shaft and sleeve area associated with the tower of FIG. 1;

FIG. 3 is a sectional enlarged view of the seal area of the shaft and sleeve area of FIG. 2; and FIG. 4 is a sectional view of a prior art embodiment shaft and sleeve area.

DESCRIPTION OF THE PREFERRED EMBODIMENT

Shown generally in FIG. 1 is the lower portion of one of a plurality of towers 10 which support a pipeline 12. Each tower 10 is mounted on wheels 14 as shown. Disposed through and fixed to the pipeline 12 in a generally vertical attitude is a tube 15, which has fixed thereto a single-piece sleeve 16. A shaft 18, comprising a lower solid shaft portion 20, and an upper hollow portion 22 fixed thereto, is positioned through the single-piece sleeve 16 in generally vertical attitude and in spaced relation to the inner surface 23 of the sleeve 16 as shown. The upper end 24 of the shaft 18 extends beyond the sleeve 16, and the lower end 26 of the shaft 18 extends beyond the sleeve 16, and beyond tube 15. The shaft 18 is supported at its lower end 26 by a tapered bearing 28 fixed within a gearbox 30 which is in turn fixed to a crossbeam 32 of tower 10. The shaft also includes a coupling 33 which is of the positive type so that it cannot be disconnected by mere lifting of the upper end 24. An annular seal 34 is disposed between the shaft 18 and the sleeve 16 for sealing therebetween, being maintained in position by an annular groove 36 defined by the inner surface 23 of the sleeve 16, in which the annular seal 34 is seated. Likewise, an annular seal 38 is disposed between the shaft 18 and the sleeve 16 for sealing therebetween, in a position spaced from the annular seal 34. The annular seal 38 is maintained in position by an annular groove 40 defined by the inner surface 23 of sleeve 16, in which the annular seal 38 is seated.

A pipe 42 interconnects the pipeline 12 with the inside of the sleeve 16, and is positioned to introduce water from the pipeline 12 into the sleeve 16 between the annular seals 34, 38. The upper portion 22 defines apertures 44 which together with the inner hollow portion 46 of the upper portion 22 defines passage means 48 for allowing passage of the water introduced in the sleeve 16 to flow through the passage means 48 to the extending end 24 of shaft 18.

Tubular rotor arms 50, 52 are fixed to the extending end 24 of the shaft 18 and communicate with the passage means 48 so that water flows through the sleeve 16 between the annular seals 34, 38 through the passage means 48, and through and from the tubular rotor arms 50, 52. The arms 50, 52 are angled as is well known to provide rotary motion to the shaft 18 about its longitudinal axis as the water flows from the arms 50, 52.

Such rotary motion of the shaft 18 is transferred through gearbox 30 to drive shafts 56, bevel pinions 58, and pinions 60, to operatively connect with the wheels 12, as is disclosed in the above mentioned U.S. Pat. No. 3,583,639.

It is to be noted that the annular seals 34, 38 are free of the vertical support of the shaft 18. This is because the means for supporting the shaft 18 (i.e., tapered bearing 28) is spaced outwardly of, i.e., below, the annular seals 34, 38 and is independent of the seals 34, 38 so that such seals 34, 38 can properly perform their function with little load thereon. This is in contrast to the prior art device shown in FIG. 4, wherein an outer sleeve 70 has fixed thereto a lower shaft 71 and is rotatably mounted on fixed inner shaft 72, and the outer sleeve 70, along with the lower shaft 71 and rotor arms 74, 76, are supported by a thrust washer 78 which acts as a seal. It has been found that, because it bears such weight, seal 78 wears out relatively rapidly, resulting in leakage and loss of power.

This is overcome in the instant case because the seals 34, 38 do not support any of such load, and consequently are effective over a much longer period of operation.

In addition, the sleeve 16 is of one-piece construction, so that the seals 34, 38 cannot be subject to wear by the means for positioning, and carrying them (i.e., annular grooves 36, 40).

What is claimed is:

1. In an irrigation system having a water-carrying pipeline supported by a plurality of towers, each tower being mounted on wheels, apparatus associated with each tower for advancing each tower and thus the pipeline over an area to be irrigated comprising:
    a single-piece sleeve fixed relative to the pipeline;
    a shaft positioned through the sleeve in spaced relation to the inner surface of the sleeve, and having an end extending therefrom;
    means for supporting the shaft in such position through the sleeve;
    the inner surface of said sleeve defining first and second spaced annular grooves;
    first annular seal means disposed in the first annular groove and between the shaft and the sleeve for sealing therebetween;
    second annular seal means disposed in the second annular groove and between the shaft and the sleeve for sealing therebetween, and in a position spaced from said first seal means;
    means for introducing water into the sleeve between the first and second seal means;
    passage means defined by the shaft for allowing passage of the water introduced in said sleeve to flow through said passage means to the extending end of the shaft;
    tubular rotor arm means fixed to the extending end of the shaft, the bore means thereof communicating with the passage means of the shaft, so that water flows through the sleeve between the first and second seal means, through the passage means defined by the shaft, and through the tubular rotor arm means, said tubular rotor arm means being angled so that the flow of water therefrom rotates the shaft about its longitudinal axis; and
    means operatively connected to said shaft for transforming said rotary movement of the shaft into rotation of the wheels, to thereby advance said tower.

2. The irrigation system of claim 1 wherein the shaft is disposed generally vertically, and wherein the means for supporting the shaft in such position through the sleeve comprise means spaced outwardly of said first and second annular seal means and independent of said first and second annular seal means, so that the first and second annular means are free of vertical support of the shaft.

3. The irrigation system of claim 2 wherein the extending end of the shaft defines the upper end of the shaft, and wherein the means for supporting the shaft comprise means associated with the lower end of the shaft.

4. The irrigation system of claim 3 wherein the means for introducing water into the sleeve between the first and second seal means comprise pipe means interconnecting the pipeline with the sleeve.

5. The irrigation system of claim 4 wherein the tubular rotor arm means comprise a pair of tubular arms fixed to the extending end of the shaft.

6. Rotary apparatus comprising:
    a single piece sleeve;
    a shaft positioned through the sleeve in spaced relation to the inner surface of the sleeve, and having an end extending therefrom;
    means for supporting the shaft in such position through the sleeve;
    the inner surface of said sleeve defining first and second spaced annular portions;
    first annular seal means disposed in the first annular groove and between the shaft and the sleeve for sealing therebetween;
    second annular seal means disposed in the second annular groove and between the shaft and the sleeve for sealing therebetween and in a position spaced from said first seal means;
    means for introducing water into the sleeve between the first and second seal means;
    passage means defined by the shaft for allowing passage of the water introduced into said sleeve to flow through said passage means to the extending end of the shaft; and
    tubular rotor arm means fixed to the extending end of the shaft, the bore means thereof communicating with the passage means of the shaft, so that water flows through the sleeve between the first and second seal means, through the passage means defined by the shaft, and through the tubular rotor arm means, said tubular rotor arm means being angled so that the flow of water therefrom rotates the shaft about its longitudinal axis.

7. The rotary apparatus of claim 6 wherein the tubular rotor arm means comprise a pair of tubular arms fixed to the extending end of the shaft.

* * * * *